US008788447B2

(12) United States Patent
Dumais et al.

(10) Patent No.: US 8,788,447 B2
(45) Date of Patent: Jul. 22, 2014

(54) HYPERLOCAL SMOOTHING

(75) Inventors: Susan T. Dumais, Kirkland, WA (US);
Alexander George Gounares, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 773 days.

(21) Appl. No.: 12/820,146

(22) Filed: Jun. 22, 2010

(65) Prior Publication Data
US 2011/0313968 A1 Dec. 22, 2011

(51) Int. Cl.
G06F 9/44 (2006.01)

(52) U.S. Cl.
USPC ............................................................ 706/52

(58) Field of Classification Search
None
See application file for complete search history.

(56) References Cited

U.S. PATENT DOCUMENTS

| | | | | |
|---|---|---|---|---|
| 2004/0243299 A1* | 12/2004 | Scaer et al. | | 701/200 |
| 2005/0278371 A1* | 12/2005 | Funk et al. | | 707/102 |
| 2006/0267783 A1* | 11/2006 | Smith | | 340/601 |
| 2007/0067195 A1 | 3/2007 | Fahner et al. | | |
| 2008/0109761 A1 | 5/2008 | Stambaugh | | |
| 2008/0243607 A1 | 10/2008 | Rohan et al. | | |
| 2009/0063646 A1* | 3/2009 | Mitnick | | 709/206 |
| 2009/0175489 A1* | 7/2009 | Harrington | | 382/100 |
| 2009/0322560 A1* | 12/2009 | Tengler et al. | | 340/905 |
| 2010/0001858 A1* | 1/2010 | Daly et al. | | 340/540 |
| 2011/0034183 A1* | 2/2011 | Haag et al. | | 455/456.3 |
| 2011/0218828 A1* | 9/2011 | Mathai et al. | | 705/4 |

OTHER PUBLICATIONS

Paluri, Track Homes with Saved Search E-mail, Jul. 2008.*
Zillow, What's a Zestimate® value?, Jul. 2009.*
Jeffrey et al, Using spatial interpolation to construct a comprehensive archive of Australian climate data.*
Puttagunta et al, Adaptive Methods for Activity Monitoring of Streaming Data, 2002.*
Hommel et al, Confidence Interval or P-Value? Part 4 of a Series on Evaluation of Scientific Publications, 2009.*
Miller, et al., "'Hyperlocal' Web Sites Deliver News without Newspapers", Retrieved at << http://www.nytimes.com/2009/04/13/technology/start-ups/13hyperlocal.html >>, Apr. 12, 2009, pp. 3.
Asuncion, et al., "On Smoothing and Inference for Topic Models", Retrieved at << http://www.gatsby.ucl.ac.uk/~ywteh/research/inference/AsuWelSmy2009a.pdf >>, In Uncertainty in Artificial Intelligence (UAI), 2009, pp. 8.
Hopper, Keith., "A Brief History of Hyperlocal News", Retrieved at << http://keithhopper.com/blog/brief-history-of-hyperlocal-news >>, Feb. 2, 2009, pp. 16.

(Continued)

Primary Examiner — Alan Chen
Assistant Examiner — Mikayla Chubb
(74) Attorney, Agent, or Firm — Dan Choi; Carole Boelitz; Micky Minhas

(57) ABSTRACT

Concepts and technologies are described herein for hyperlocal smoothing. The hyperlocal smoothing solutions described herein provide a smooth view of data and events across hyperlocal geographic areas by combining sparse data available with inferred or extrapolated data. Additionally, the hyperlocal smoothing solutions described herein make use of contextual analysis to interpret service requests in a manner appropriate for a targeted hyperlocal area. Thus, the smooth view of data can be queried in a contextually sensitive manner to return relevant information for a hyperlocal geographic area, even in circumstances wherein data relevant to the hyperlocal geographic area is sparse or even non-existent.

19 Claims, 5 Drawing Sheets

(56) References Cited

OTHER PUBLICATIONS

"PDA + Hyperlocal Media", Retrieved at << http://www.guardian.co.uk/media/pda+hyperlocal-media >>, Mar. 18, 2010, pp. 13.
"Hyperlocal News Site—Now Build one for your Neighbourhood [Everyblock Goes Open Source]", Retrieved at << http://www.pluggd.in/hyperlocal-news-site-everyblock-goes-open-source-297/ >>, Jul. 7, 2009, pp. 5.
Stone, Brad., "MSNBC.com Acquires EveryBlock, a Hyperlocal News Start-up", Retrieved at << http://bits.blogs.nytimes.com/2009/08/17/msnbccom-acquires-hyperlocal-startup-everyblock/ >>, Aug. 17, 2009, pp. 7.

\* cited by examiner

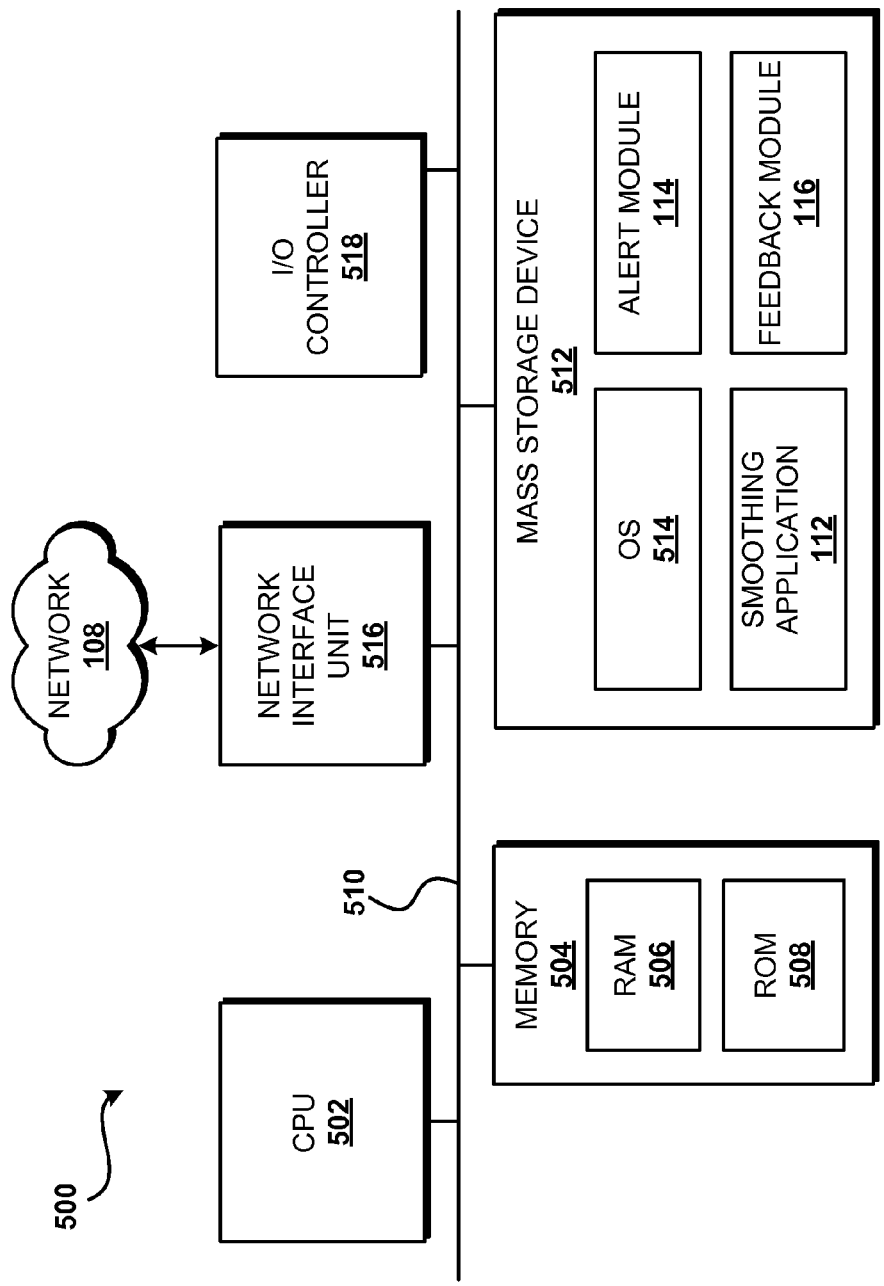

HYPERLOCAL SMOOTHING

BACKGROUND

In the context of the Internet, "hyperlocal" refers to services or products that focus on or are geared to narrowly targeted geographies. Thus, a hyperlocal service such as hyperlocal news, hyperlocal reviews, or hyperlocal search can be accessed by a user to access information relative to a narrow geographic area such as a neighborhood or street. Hyperlocal services, therefore, are able to provide information that is likely to be perceived as being more relevant to a user than more broadly defined geographic areas such as towns, cities, metropolitan areas, and the like.

Many hyperlocal services, however, suffer from a data scarcity problem. In the case of news, for example, news may not be available for each neighborhood or town in the country. In addition to the data scarcity problem, hyperlocal services create new challenges with respect to defining search parameters or service requests. For example, some search terms or service requests may be subject to varying definitions, based upon a geographic area targeted in a search query or service request. These varying definitions may affect how a hyperlocal service should define a geographic area, a search term, what constitutes an important news story, and the like, as these terms and concepts may vary depending upon location, demographics, and other aspects of a covered area.

It is with respect to these and other considerations that the disclosure made herein is presented.

SUMMARY

Concepts and technologies are described herein for hyperlocal smoothing. The hyperlocal smoothing solutions described herein provide a smooth view of data and events across hyperlocal geographic areas by combining sparse data available from a specific locale with inferred or extrapolated data from related locales. Additionally, the hyperlocal smoothing solutions described herein make use of contextual analysis to interpret service requests in a manner appropriate for a targeted hyperlocal area. Thus, the smooth view of data can be queried in a contextually sensitive manner to return relevant information for a hyperlocal geographic area, even in circumstances wherein data relevant to the hyperlocal geographic area is non-existent or not reliable because the data is sparse, out of date, provide by unreliable sources, etc.

According to one aspect, an inference data server ("IDS") hosts an entity database and attribute data. The entity database stores one or more data sets relating to entities. As used herein, "entities" and variants thereof, are used to refer to one or more subjects, topics, concepts, people, institutions, companies, groups, events, stories, news items, occurrences, and/or other issues, places, personas, stories, or topics. As used herein, "attributes" refer to one or more aspects of the entities, for example, a location, time, date, availability, history, value, or other information corresponding to the entities.

The IDS can serve entity data and attribute data on request to provide hyperlocal services, and for other purposes. In some embodiments, a request for hyperlocal services is received. The request may explicitly or implicitly require the obtaining of attribute data relating to an entity. If explicit attribute data is not available to satisfy the request, implicit or inferred attribute data can be calculated or generated to satisfy the request. If explicit attribute data is available but unreliable, it can be augmented with inferred attribute data.

According to another aspect, an inference engine includes a smoothing application. The smoothing application determines what attribute data is needed to calculate an inferred attribute data. The inference engine receives the attribute data, and the smoothing application calculates the inferred attribute data. The inferred attribute data can be stored at the IDS, provided to a requestor, and/or otherwise output by the inference engine.

According to another aspect, the inference engine includes an alert module for generating alerts relating to inferred attribute data. The alert module receives an alert request, determines parameters relating to the request, and analyzes updated values for the inferred attribute data to determine if an alert should be generated. Upon determining that a parameter is met, the alert module generates an alert. The inference engine also can include a feedback module for receiving feedback and using the feedback to track and/or improve performance of the inference engine.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a computer architecture diagram illustrating an exemplary computer hardware and software architecture for a computing system capable of implementing aspects of the embodiments presented herein.

DETAILED DESCRIPTION

Figure 1:
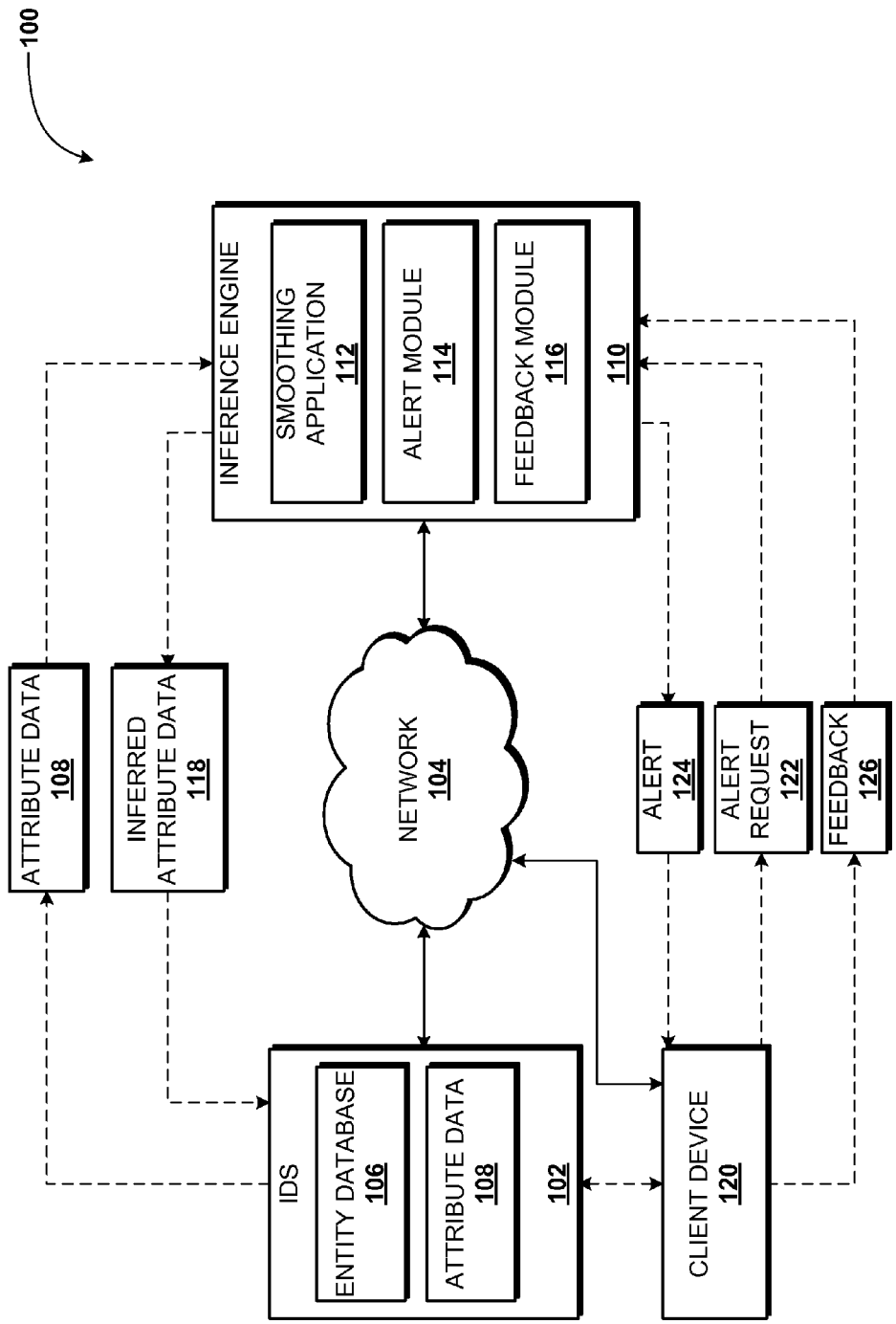
FIG. 1 is a system diagram illustrating an exemplary operating environment for the various embodiments disclosed herein.

The following detailed description is directed to technologies for hyperlocal smoothing. The hyperlocal smoothing solutions described herein provide a smooth view of data and events across hyperlocal geographic areas by combining sparse data available from a specific locale with inferred or extrapolated data from related locales. Locales can be determined to be related on the bases of location, demographics, and other considerations. Additionally, the hyperlocal smoothing solutions described herein make use of contextual analysis to interpret service requests in a manner appropriate for a targeted hyperlocal area. Thus, the smooth view of data can be queried in a contextually sensitive manner to return relevant information for a hyperlocal geographic area, even in circumstances wherein data relevant to the hyperlocal geographic area is non-existent or not reliable because the data is sparse, out of date, provide by unreliable sources, and the like.

In some embodiments, an inference data server ("IDS") hosts an entity database and attribute data. The entity database stores one or more data sets relating to entities. As used herein, "entities" and variants thereof, are used to refer to one or more subjects, topics, concepts, people, institutions, companies, groups, events, stories, news items, occurrences, and/or other issues, places, personas, stories, or topics. As used herein, "attributes" refer to one or more aspects of the entities, for example, a location, time, date, availability, history, value, or other information corresponding to the entities.

The IDS can serve entity data and attribute data on request to provide hyperlocal services, and for other purposes. In some embodiments, a request for hyperlocal services is received. The request may explicitly or implicitly require the obtaining of attribute data relating to an entity. If explicit attribute data is not available to satisfy the request, implicit or inferred attribute data can be calculated or generated to satisfy the request. If explicit attribute data is available but unreliable, it can be augmented with inferred attribute data.

In some embodiments, an inference engine includes a smoothing application. The smoothing application determines what attribute data is needed to calculate an inferred attribute data. The inference engine receives the attribute data, and the smoothing application calculates the inferred attribute data. The inferred attribute data can be stored at the IDS, provided to a requestor, and/or otherwise output by the inference engine. The inference engine can include an alert module for generating alerts relating to inferred attribute data. The alert module receives an alert request, determines parameters relating to the request, and analyzes updated values for the inferred attribute data to determine if an alert should be generated. Upon determining that a parameter is met, the alert module generates an alert. The inference engine also can include a feedback module for receiving feedback and using the feedback to track and/or improve performance of the inference engine.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for hyperlocal smoothing will be presented.

Referring now to FIG. 1, aspects of one operating environment 100 for the various embodiments presented herein will be described. The operating environment 100 shown in FIG. 1 includes an inference data server 102 ("IDS"). According to various embodiments, the functionality of the IDS 102 described herein may be provided by one or more data storage locations, server computers, desktop computers, mobile telephones, laptop computers, other computing systems, and the like. In the illustrated embodiment, the IDS 102 is described as a server computer configured to operate on or in communication with a network 104. It should be understood that this embodiment is exemplary.

As illustrated in FIG. 1, the IDS 102 hosts or is in communication with an entity database 106. The entity database 106 can store one or more entity data sets. As used herein, "entities" and variants thereof, are used to refer to one or more subjects, topics, concepts, people, institutions, companies, groups, events, stories, news items, occurrences, and/or other issues, places, personas, stories, or topics. Thus, the entity database 106 can store data describing almost anything.

Additionally, the IDS 102 hosts attribute data 108. The attribute data 108 describes the entities represented by the data stored in the entity database 106. The attribute data 108 can be linked to the entity data stored in the entity database 106 via any desired method of data association. The attribute data 108 can include, but is not limited to, location information, time information, review information, availability information, value or price information, history information, and/or other data. Optionally, each of these attributes can include additional information about the provenance of the data— e.g., who entered a review, where and when it was entered, etc. An exemplary data structure for storing the attribute data 108, as well as exemplary data stored as the attribute data 108, are described in additional detail below with reference to FIG. 2. It should be understood that data relating to the entities and the attributes can be stored together in a single data structure, if desired. Thus, the illustrated embodiment, wherein the entity database 106 and the attribute data 108 are illustrated separately, should be understood as being an exemplary implementation of the IDS 102.

The entity database 106 is configured to store large data sets of entities. The attribute data 108 stores one or more data sets of attributes, or aspects, of the entities that are already known, or have already been calculated, as will be explained in more detail below. Thus, for each entity in the entity database 106, the attribute data 108 can include one or more attributes of the entity. A user may request a hyperlocal service relating to an entity. The request can include a search query, a request for news relative to a location, a request for reviews for a restaurant, or the like. The entity database 106 can be queried or searched to determine if the entity referenced in the request is represented, and the attribute data 108 can be queried or searched to determine if attributes of the entity are known.

As will be explained in more detail below with reference to FIG. 3, attributes of entities may be explicit or implicit, and each attribute can have an associated confidence interval or score. An example of explicit attribute data includes a review for a particular restaurant. With respect to this restaurant, the attribute data corresponding to the review is explicit. If, however, a review is not available for the particular restaurant, the attribute data corresponding to the review may be calculated implicitly, as described herein.

To calculate attribute data implicitly, the data stored at the IDS 102 can be analyzed to identify attributes and/or attribute data that may be relevant to calculated attribute data of interest. Thus, the concepts and technologies described herein make use of known entity data and attribute data, smooth data points to infer, extrapolate, or estimate attribute data for entities, and assign confidence values or intervals to the inferred attribute data. Feedback from users can be used to update assumptions or estimations made during the calculation of inferred attributes, and the inferred attributes can be stored in the attribute data 108 and/or used to calculate additional inferred attribute data, if desired.

Although not illustrated in FIG. 1, it should be understood that the operating environment 100 can include a search engine that receives and responds to queries from one or more users of the search engine. In some embodiments, the IDS 102 is searchable by the search engine to provide hyperlocal search results. Thus, the search engine can satisfy a query relating to a particular entity by accessing the entity database 106 and/or the attribute data 108. Other devices can be configured to request information regarding an entity, as will be explained in more detail herein. Exemplary requests for information regarding an entity, as well as exemplary uses of the data hosted by the IDS 102 are described below with reference to FIG. 2.

At times, a request for information regarding an entity includes a request for attribute data 108 that is explicitly available and reliable. In such occurrences, the attribute data 108 may be readily retrieved and provided to the requestor to provide hyperlocal services such as hyperlocal news, hyperlocal search services, hyperlocal shopping, hyperlocal reviews services, and the like. At other times, however, explicit information relating to an entity is sparse or unavailable. For example, a request may relate to a new restaurant, an emerging celebrity, a new technology, a historical figure for which data is sparse, an area for which data is scarce, and the like. In such circumstances, there may be no data available, or the data available may not accurately represent the entity to which the data relates. In some embodiments, therefore, the operating environment 100 includes an inference engine 110 for providing the functionality described herein for hyperlocal smoothing.

The inference engine 110 is configured to execute an operating system (not illustrated) and one or more application programs such as, for example, a smoothing application 112, an alert module 114, and a feedback module 116. The operating system is a computer program for controlling the operation of the inference engine 110. The application programs are executable programs configured to execute on top of the operating system to provide the functionality described herein. Although the smoothing application 112, the alert module 114, and the feedback module 116 are illustrated as components of the inference engine 110, it should be understood that each of these components, or combinations thereof, may be embodied as or in stand-alone devices or components thereof operating on or in communication with the network 104 and/or the inference engine 110.

The smoothing application 112 is configured to obtain and analyze the attribute data 108 relating to one or more entities, and to generate inferred attribute data 118 for the one or more entities based, at least partially, upon the attribute data 108. The inferred attribute data 118 can be provided to a requestor and/or stored in the IDS 102 for use in providing hyperlocal services. For purposes of illustrating the concepts and technologies described herein, the requestor will be described as a user of a client device 120 such as, for example, a mobile telephone, a smart phone, a desktop computer, a laptop computer, a PDA, a tablet computer, a server computer, a search engine, other computing systems, and the like. It should be understood, however, that the requestor or other consumer of the inferred attribute data 118, is not limited to a user of a device. According to various embodiments, for example, functionality herein is requested by or consumed by an entity, a network device or node, and/or a service or software request. It therefore should be understood that the described example, wherein the requestor is a user of the client device 120, is illustrative, and should not be construed as being limiting in any way. The functionality of the smoothing application 112 will be described in more detail below with respect to FIGS. 2-5.

The alert module 114 is configured to receive alert requests 122 from the client device 120, to determine when the alert requests 122 are satisfied, and to provide the requested alerts 124 when the alert requests 122 are satisfied. As will be explained in more detail with reference to FIG. 4, the alert requests 122 can relate to an entity for which inferred attribute data 118 is generated by the inference engine 110. Thus, determining that the alert requests 122 are satisfied can include using the functionality of the smoothing application 112, as well as other hardware and software components of the operating environment 100. Exemplary alert requests 122, alerts 124, and the functionality of the alert module 114 are described in more detail below with reference to FIG. 4.

The feedback module 116 is configured to receive feedback 126 from the client device 120. The feedback 126 can relate to the inferred attribute data 118, and can be used by the inference engine 110 to improve the functionality described herein for hyperlocal smoothing, and/or to update the inferred attribute data 118 generated by the inference engine 110 and/or stored at the IDS 102. As mentioned above, the feedback 126 can be received from the client device 120. For example, the user of the client device 120 may consume hyperlocal services that rely upon the IDS 102 and/or the inference engine 110. The user may provide the feedback 126 to the inference engine 110. The feedback module 116 recognizes the feedback 126, and can pass data relating to the feedback 126 to the smoothing application 112 and/or the alert module 114 for any desired purpose.

FIG. 1 illustrates one IDS 102, one network 104, and one inference engine 110. It should be understood, however, that some implementations of the operating environment 100 include multiple IDSs 102, multiple networks 104, and multiple inference engines 110. Therefore, the illustrated embodiment should be understood as being exemplary, and should not be construed as being limiting in any way.

Figure 2:
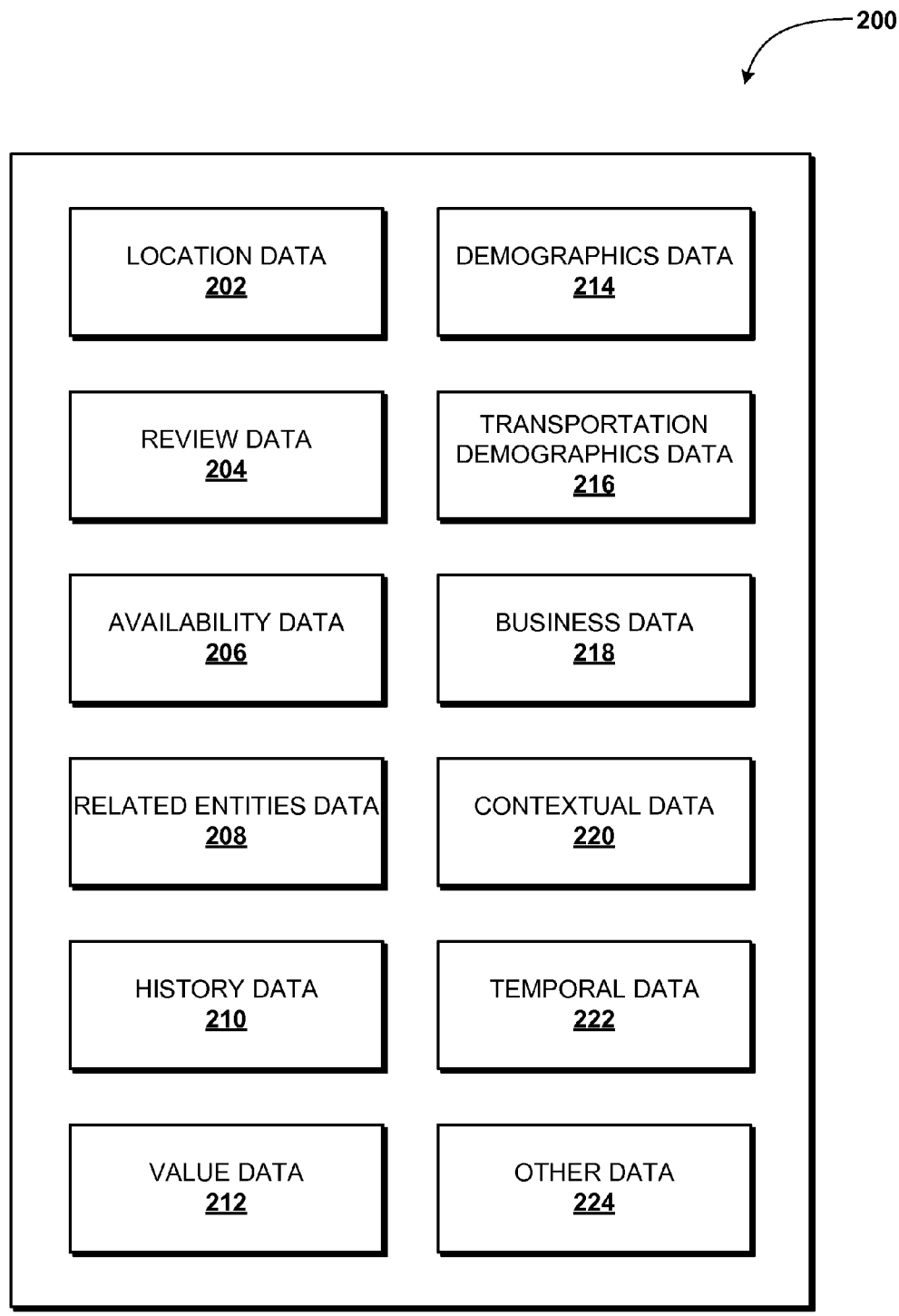
FIG. 2 schematically illustrates a data structure for storing attribute data, according to an exemplary embodiment.

Turning now to FIG. 2, additional aspects of the attribute data 108 are described. In particular, FIG. 2 is block diagram illustrating a data structure 200 for storing the attribute data 108, according to an exemplary embodiment of the present disclosure. It should be understood that the illustrated attribute data 108 is exemplary, and should not be construed as being limiting in any way. The functionality of the data store 200 can be provided by one or more data storage devices associated with and/or in communication with the inference engine 110. In the illustrated embodiment of FIG. 1, the functionality of the data store 200 is provided by the IDS 102. It should be understood that this embodiment is exemplary, and should not be construed as being limiting in any way.

As mentioned above, the attribute data 108 stores data associated with one or more entities. The data stored in attribute data 108 can be generated at any time, and can relate to any number of entities. In some embodiments, the data stored as the attribute data 108 is generated by searching networks such as the Internet for data relating to the entities, and analyzing data associated with the entities. More particularly, data associated with the entities may be analyzed to determine various aspects of the entities, and this data may be stored as the attribute data 108 at the IDS 102.

The data stored as the attribute data 108 can include, but is not limited to, location data 202, review data 204, availability data 206, related entities data 208, history data 210, value data 212, demographics data 214, transportation demographics data 216, business data 218, contextual data 220, temporal data 222, other data 224, and alternative data. One or more of these types of data can be stored in one or more databases, servers, and/or other data storage devices. Thus, while the data structure 200 is illustrated as including all of the attribute data 108 described herein, it should be understood that various data storage devices can be used to host or store the attribute data 108.

The location data 202 identifies one or more locations associated with an entity and/or a location associated with an attribute relating to the entity. For example, if an entity is associated with a street address, the location data 202 may identify the street address as the location of the entity. The location data 202 can be defined in various levels of precision. For example, the location data 202 may be defined in extremely precise terms such as a street address, a GPS location, a city block, and/or a neighborhood. Additionally, the location data 202 may be defined in less precise terms such as a town, city, or metropolitan area. In one implementation of the data structure 200, the location data 202 stored at the IDS 102 is stored in precise terms such as a street address, GPS location, city block, and/or neighborhood, as this level of precision is well-suited for hyperlocal applications such as news, traffic, reviews, and the like. It should be understood that this embodiment is exemplary.

As mentioned above, the location data 202 also may relate to another attribute associated with the entity. For example, as is described herein, reviews may be stored as the attribute data 108 as the review data 204. It may be desirable to know the location of the party who reviewed the entity. Thus, the location data 202 may include data indicating the location of the reviewer. This example is illustrative, and should not be construed as being limiting in any way.

As mentioned above, the review data 204 can describe reviews relating to an entity. For example, if the entity is a restaurant, the review data 204 can include one or more reviews associated with the restaurant. It should be understood that the review data 204 may be parameterized. Exemplary parameters for the review data 204 include a person parameter, a time parameter, a location parameter, a reviewer history parameter, and other parameters. The person parameter can be used to associate the review data 204 with a particular person ("reviewer"). Similarly, the reviewer history parameter can be used to associated the review data 204 with a reviewer history.

The person and reviewer history parameters can be used to contextualize the review data 204. For example, a reviewer may provide negative reviews 95% of the time, a fact that may be determined from reviewing the reviewer's history. This fact may be used to weight a confidence attributed to the review data 204 associated with the reviewer, as it may be clear that the reviewer has a propensity to provide negative reviews. Similarly, a positive review from this reviewer may be given more authority as it may be clear that this reviewer is hard to please. These examples are illustrative, and should not be construed as being limiting in any way.

The availability data 206 can indicate whether an entity is available. For example, the entity can include a product, service, discount, event, or the like. Thus, the availability data 206 can describe whether the product, service, or discount is available, and/or if tickets or admission to the event are available. The related entities data 208 can indicate other entities in the entity database 106 that are related to an entity. The indication that an entity is related to another entity can be used when data is sparse or unavailable. For example, locations of a franchise restaurant may be indicated as related by the related entities data 208. Thus, the quality and price of food, as well as the level of service and customer satisfaction may be assumed to be similar and/or identical, given the association between the restaurants given their relationship as part of the same franchise. This may be reflected in the related entities data 208. Thus, the related entities data 208 therefore may indicate other entities that may be analyzed if attribute data 108 for a particular entity is sparse or unavailable.

This history data 210 can indicate a history associated with an entity. The history data 210 can be used to provide context for the attribute data 108. For example, review data 204 corresponding to reviews for a comedy show may be contextualized by way of the history data 210. If, for example, the comedy show has only been presented one time, the review data 204 may be determined to be sparse, and therefore minimally reliable. Similarly, if the recent reviews for a restaurant are all poor, then older positive reviews in the review data 204 may be determined to be out-of date, and therefore unreliable. In addition to, or instead of, providing context for other attribute data 108, the history data 210 can be used to describe history of an entity for other purposes. For example, the history of a store in a particular town may be used to make assumptions regarding other businesses and/or other inhabitants of the town. These embodiments are exemplary.

The value data 212 can indicate a value or price associated with an entity. For example, the value data 212 can indicate the value or price of an entity such as a good, product, or service. The demographics data 214 can indicate demographics associated with an entity and/or a location of the entity. In the case of a location such as a town, city, neighborhood, or street, for example, the demographics data 214 can describe population, population density, income, family size, house type and size, education, age, ethnicity, religion, and the like. Similarly, the transportation demographics data 216 can indicate transportation demographics associated with an entity and/or a location of the entity. In the case of a location such as a town, city neighborhood, or street, for example, the transportation demographics data 216 can indicate how people travel. Thus, the transportation demographics data 216 can indicate public transportation usage, automobile ownership and usage, bicycle usage, pedestrian traffic, traffic levels, and/or other transportation demographics associated with an entity. These examples are illustrative, and should not be construed as being limiting in any way.

The business data 218 can indicate business information associated with entities. The business data 218 can include, but is not limited to, official business filings such as corporate or real estate filings, Security Exchange Commission ("SEC") or Uniform Commercial Code ("UCC") filings, and/or other information. Additionally, the business data 218 can include business ratings and information such as business profiles, business histories, complaint histories, and other business information.

The contextual data 220 can be used to provide context for an entity and/or for attribute data 108 associated with an entity. For example, the meaning of the word "near" can vary widely depending upon the geophysical characteristics of a particular location, as well as the population density, road conditions, time of year, transportation demographics, and culture associated with the location. In a rural town, 10 miles may be considered "near." In a large metropolitan area such as Manhattan, on the other hand, more than a half mile or so may not be considered "near."

With respect to land-locked areas, islands, peninsulas, areas accessible only by ferry or pedestrian traffic, and the like, the definition of "near," "close," "long walk," and the like, may vary widely. Additionally, words such as "pop," "soda," and "coke" are sometimes used interchangeably to refer to soft drinks such as COCA COLA. Similarly, "soda" is used in some areas to refer to carbonated water, which also may be referred to as "seltzer." These definitions may be location-dependent, and may change even on a hyperlocal scale. Thus, the contextual data 220 can store data indicating context for other attribute data such as the location data 208.

Similarly, the contextual data 220 can provide context for the review data 204 by indicating if a review is from a customer perspective, an employee perspective, a competitor perspective, a landlord perspective, and the like. The contextual data 220 also can be used to contextualize the availability data 206 by indicating if the availability data 206 refers to a time of availability, to availability of a product, availability of a service, or the like. These examples are illustrative, and other attribute data 108 also may be contextualized, if desired.

The temporal data 222 can indicate time information for an entity and/or for attribute data 108 associated with an entity. The temporal data 222 can include operating hours for an entity, a date of opening or closing, or other dates. Additionally, the temporal data 222 can be used to provide context for the review data 204, by indicating whether the review data 204 is current. Furthermore, the temporal data 222 can be used to provide context for the value data 212, as prices or values of goods, products, or services can change rapidly depending upon market conditions, and the like. In the case of a share of stock, for example, the value may vary widely in a matter of minutes or seconds, while a real estate value may shift more gradually. Thus, the temporal data 222 may be used to contextualize the value data 212 based upon what type of entity is being considered. Other attribute data 108 may be contextualized based upon time, so these examples should not be construed as being limiting with regard to the concepts and technologies disclosed herein.

The other data 224 can include various other data relating to an entity. Examples of the other data 224 include, but are not limited to, ownership data, ethnicity data, religion data, road construction information, special events, and the like. Additionally, the other data 224 can include particular types of data that are subject to contextual variation such as, for example, the meaning of the word "near" in a particular location, the meaning of the word "recent" with respect to a particular entity or attribute, and the like. The other data 224 also can include confidence ranges, scores, intervals, or values for any of the attribute data 108 and/or combinations thereof. These examples are illustrative, and should not be construed as being limiting in any way.

Figure 3:
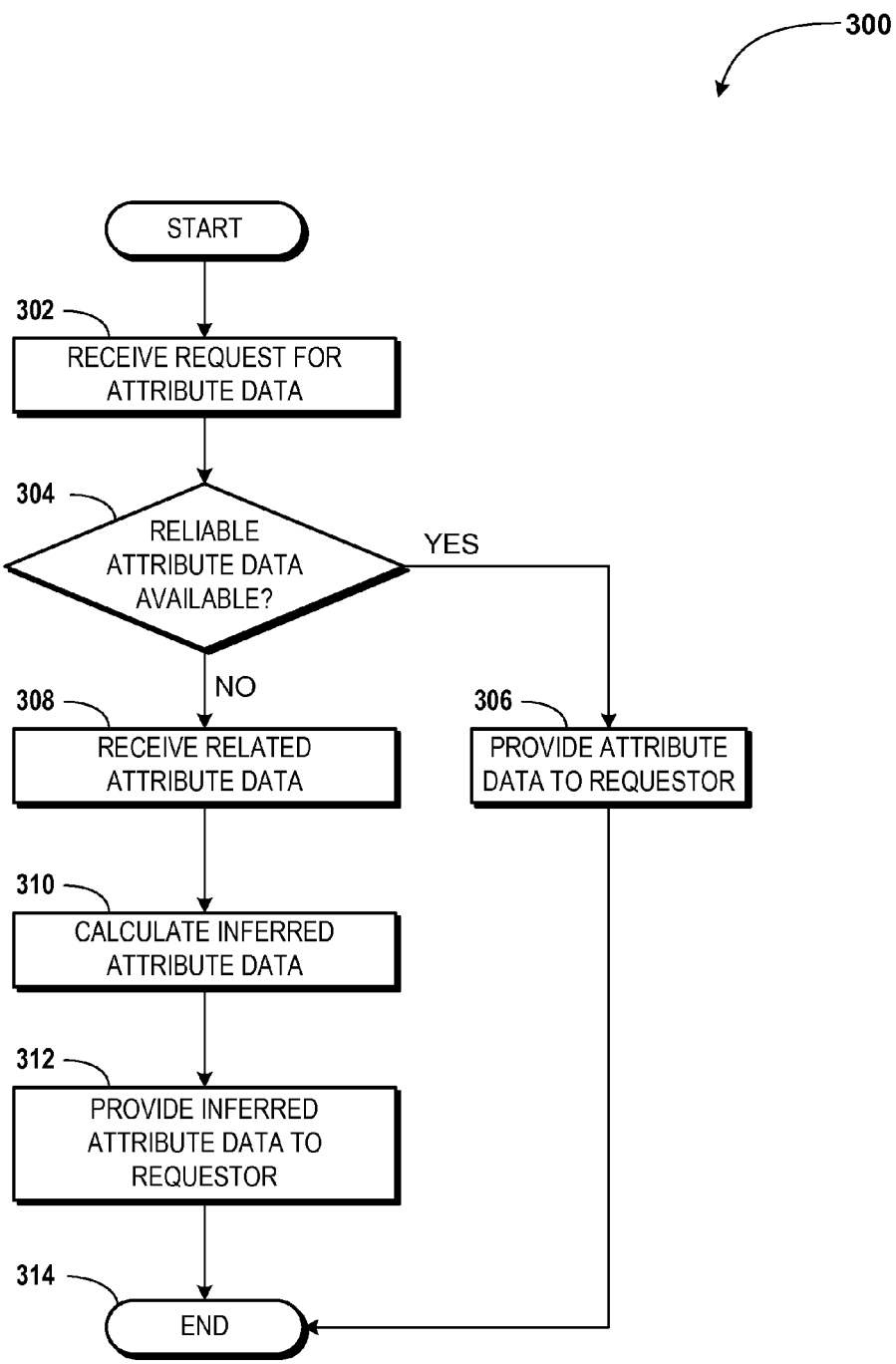
FIG. 3 is a flow diagram showing aspects of a method for hyperlocal smoothing, according to an exemplary embodiment.

Turning now to FIG. 3, a method 300 for hyperlocal smoothing will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined above. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the inference engine 110. It should be understood that these embodiments are exemplary, and should not be viewed as being limiting in any way. The method 300 begins at operation 302, wherein the inference engine 110 receives a request for attribute data 108. In some embodiments, the request for the attribute data 108 is generated by a search engine in response to receiving query relating to an entity. Exemplary requests include requests for hyperlocal news, requests for hyperlocal traffic, hyperlocal search queries, and the like.

From operation 302, the method 300 proceeds to operation 304, wherein the inference engine 110 determines if the requested attribute data 108 is available and reliable. For example, the inference engine 110 may access the IDS 102. Additionally, or alternatively, the inference engine 110 may transmit a request to the IDS 102, and receive a response from the IDS 102 indicating if the attribute data 108 is available and reliable. Additionally, the inference engine 110 can query the IDS 102 for the attribute data 108. If the requested attribute data 108 is available and reliable, the method 300 proceeds to operation 306, wherein the attribute data 108 is retrieved from the IDS 102 and provided to the requestor. It should be understood that the attribute data 108 can include explicit attribute data, or inferred attribute data 118 that has been stored as the attribute data 108. After providing or allowing access to the attribute data 108, the method 300 can end.

Returning to operation 304, if the inference engine 110 determines that the requested attribute data 108 is not available or is not reliable, the method 300 proceeds to operation 308, wherein the inference engine 110 receives related attribute data 108. Although not illustrated in FIG. 3, it should be understood that operation 308 may include determining what attribute data 108 is available and reliable, and requesting the attribute data 108 for analysis and generation of the inferred attribute data 118. Thus, operation 308 can include the inference engine 110 and/or the IDS 102 determining that attribute data 108 relating to a particular entity is sparse or unavailable, out of date, associated with an unreliable source, or the like, and identification of related attribute data 108.

As mentioned above, the inference engine 110 can determine that the requested attribute data 108 is unreliable based upon a number of considerations. For example, the inference engine 110 can determine that the attribute data 108 is unreliable if the attribute data 108 is sparse, out of date, provided by an unreliable source, or the like. The attribute data 108 can be determined to be sparse if a number of available attribute data 108 observations, or a variation between the various observations, do not provide enough observations to generate the inferred attribute data 118, or to generate the inferred attribute data 118 with a defined confidence threshold. Thus, ten attribute data 108 observations that are consistent with one another may be considered reliable, while twenty widely varying attribute data 108 observations may be considered unreliable.

Similarly, the inference engine 110 can determine that the requested attribute data 108 is out of date, and therefore unreliable. The inference engine 110 can identify trends in the attribute data 108, and may recognize that old attribute data 108 observations are now out of date, and therefore unreliable. For example, if a new restaurant opens, the first reviews of the restaurant may be considered to be less reliable than newer reviews submitted after the restaurant has been open for some time. Similarly, weather patterns, traffic patterns, and the like, may change over time, rendering older data less reliable than newer data.

The inference engine 110 also can determine that the requested attribute data 108 is provided by an unreliable source, and is therefore unreliable. The inference engine 110 may identify an unreliable source in a number of ways. For example, the inference engine 110 may recognize that a particular reviewer frequently provides negative or positive reviews. Thus, the inference engine 110 may recognize that this reviewer is potentially biased toward negative or positive reviews. Similarly, the inference engine 110 may recognize that a particular source for news or weather is incorrect a certain portion of the time. Thus, the inference engine 110 may dismiss news or weather from that source, or attach a lowered confidence interval to news or weather from that source. Similarly, new sources of the attribute data 108, sources of the attribute data 108 that vary from other sources a particular portion of the time or a by a particular degree, sources of the attribute data 108 that appear to have a bias, or the like, can be determined to be unreliable sources. It should be understood that the above examples of unreliable attribute data 108 are not exhaustive, and therefore should not be construed as being limiting in any way.

As explained above with reference to FIG. 2, the inference engine 110 and/or the IDS 102 may review the related entities data 208 to identify related entities, and retrieve attribute data 108 corresponding to the related entities. For example, the related entities data 208 may indicate that a first restaurant is related to a second restaurant. This relation may be by way of ownership, geography, proximity, food type, demographics in the neighborhood, menu contents or prices, and/or other information. Thus, if a request relates to the first restaurant or the second restaurant, the related entities data 208 can allow the attribute data 108 of one or both of the restaurants to be combined and/or extrapolated to calculate inferred attribute data 118 for one or both of the restaurants, or a third restaurant that also is related to one or both of the restaurants. Other contemplated embodiments use other methods of identifying related entities and/or attribute data for analysis such as data association tables, ownership databases, and the like. Thus, this example should be understood as illustrative of the principles and concepts disclosed herein, and should not be construed as being limiting in any way.

From operation 308, the method 300 proceeds to operation 310, wherein the inference engine 110 calculates the inferred attribute data 118. The calculation of the inferred attribute data 118 can include the use of multiple formulae and/or algorithms to combine and smooth data points to allow inference, estimation, and/or extrapolation of data that is not explicitly available. For example, a user may request a hyperlocal weather report for his neighborhood ("Neighborhood1"). Neighborhood1 may exist in the entity database 106, but weather data may be unavailable for Neighborhood1. Meanwhile, there may be two nearby neighborhoods, Neighborhood2 and Neighborhood3. In this simple example, the calculation of weather data for Neighborhood1 may include using the smoothing application 112 to combine the attribute data 108, in this example weather for Neighborhood2 and Neighborhood3, location data for all three neighborhoods, and/or other data, and smoothing those data to obtain an extrapolated value for weather at Neighborhood1.

From this example, it should be clear that the smoothing application 112 is configured to select and apply the attribute data 108 according to the calculation at hand. In some embodiments, the functionality for selecting and combining the attribute data 108 is provided by a combination module (not illustrated). In other embodiments, each type of attribute is calculated by a corresponding inference engine 110 that is configured to select and combine a particular combination of attribute data 108. It will therefore be understood that the attribute data 108 may be used to calculate various inferred attribute data 118, but may be combined in different ways, weighted in different ways, and the like, by the inference engine 110 and/or multiple inference engines 110.

From operation 310, the method 300 proceeds to operation 312, wherein the inference engine 110 outputs the inferred attribute data 118 to the requestor. As mentioned above, the inferred attribute data 118 can be stored at the IDS 102 or another data storage location, or transmitted or otherwise made accessible to a requestor accessing the inference engine 110. The method 300 ends at operation 314.

Figure 4:
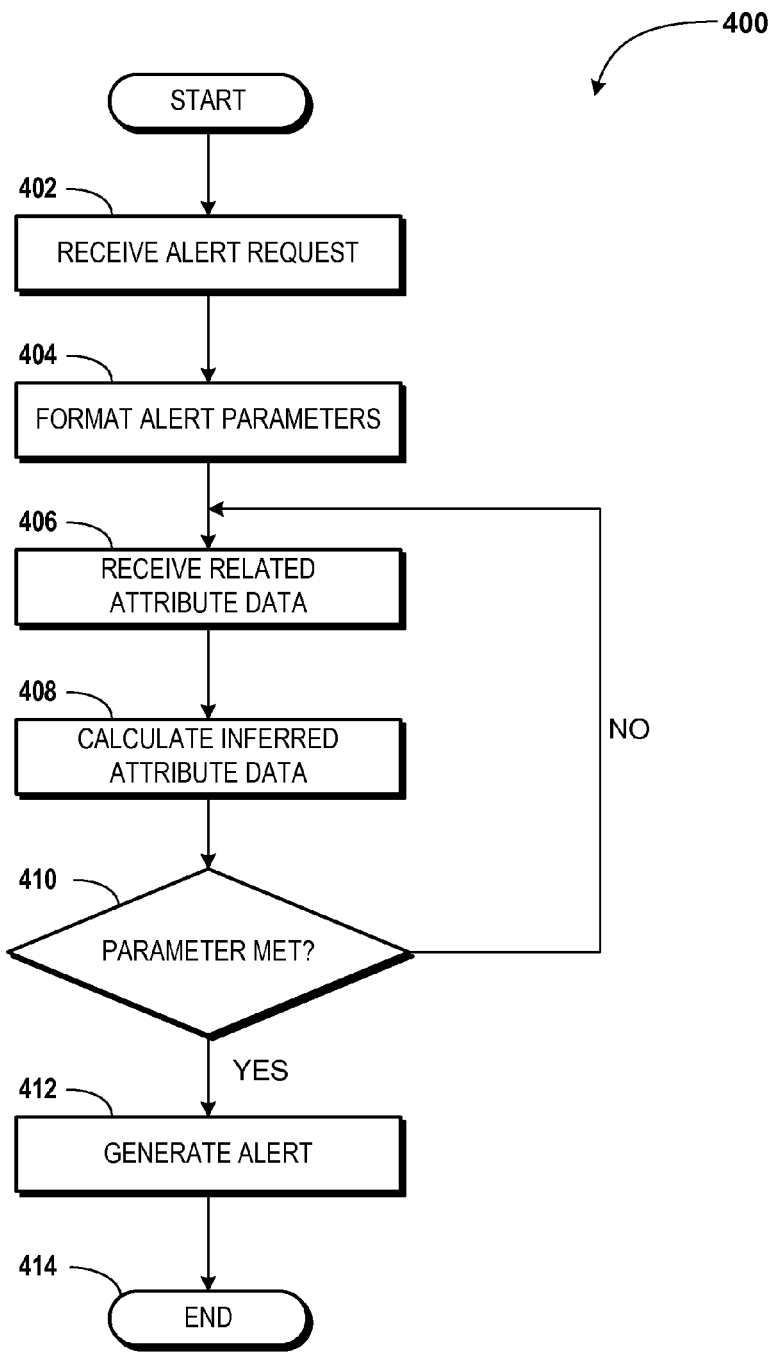
FIG. 4 is a flow diagram showing aspects of a method for hyperlocal smoothing, according to another exemplary embodiment.

Turning now to FIG. 4, a method 400 for providing alerts using hyperlocal smoothing will be described in detail. The method 400 is described as being performed by the inference engine 110 and/or the alert module 116. It should be understood that this embodiment is exemplary, and that the functionality described herein may be provided by additional and/or alternative devices and modules.

The method 400 begins at operation 402, wherein the inference engine 110 receives an alert request 122 from a requestor. As mentioned above, the alert request 122 can be received from a client device 120. For example, a user of a search engine may generate an alert request 122 for an alert if information relating to an entity becomes available or changes, or if the inferred attribute data 118 changes and/or changes significantly. In the hyperlocal context, an inferred review for a restaurant for which reviews are not available may change significantly after a certain number of reviews are received. It should be understood that a single review may be insufficient to generate an alert, as a single review may be associated with a low confidence level. Thus, the alert 124 may not be provided until a number of reviews reaches a threshold sample size and/or if the attribute data changes significantly, if desired.

From operation 402, the method 400 proceeds to operation 404, wherein the alert request 122 is analyzed to identify one or more parameters relating to the triggering of an alert 124. The parameters of the alert request 122 can include context and threshold parameters such as the particular types of attribute data 108 for which alerts 124 are requested, as well as threshold levels for those attribute data 108. As an example, a user of a search engine may generate an alert request 122 to advise the user if there are any traffic issues in the Bellevue area that will impact the user's commute by more than five minutes. In such a case, the parameters of the alert request include a five minute threshold for the traffic issues, and the context includes references to various attribute data 108, in this case, location data 202, transportation demographics data 216, contextual data 220, temporal data 222, and other data 224, such as road construction data.

It should be understood that the threshold for an alert 124 can be set for the inferred attribute data 118, and not merely for a single value. In other words, determining that a threshold is met may include performing the entire inferred attribute data 118 calculation, and not merely determining that a single data point has changed. Thus, it should be understood that the threshold parameter described above may be dependent not only upon the changing of one value alone, but instead may depend upon the changing of multiple values, and thereby the value obtained by the calculation of the inferred attribute data 118, as described above with reference to FIG. 3.

From operation 404, the method 400 proceeds to operation 406, wherein the inference engine 110 receives related attribute data 108, as discussed above with reference to operation 308 of FIG. 3. From operation 406, the method 400 proceeds to operation 408, wherein the inference engine 110 calculates the inferred attribute data 118, as described above with reference to operation 310 in FIG. 3. Thus, operation 408 can include using the smoothing application 112 to determine the inferred attribute data 118 based upon the attribute data 108.

From operation 408, the method 400 proceeds to operation 410, wherein the inference engine 110 determines if any of the parameters identified in operation 402 are met. If none of the parameters are met, the method 400 returns to operation 406, wherein the inference engine 110 receives the attribute data 108. If the inference engine 110 determines that one or more of the parameters identified in operation 402 are met, the method 400 proceeds to operation 412, wherein the inference engine 110 generates the alert 124. The method 400 ends at operation 414.

FIG. 5 illustrates an exemplary computer architecture 500 for a device capable of executing the software components described herein for hyperlocal smoothing. Thus, the computer architecture 500 illustrated in FIG. 5 illustrates an architecture for a server computer, mobile phone, a PDA, a smart phone, a server computer, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the operating system 514, the smoothing application 112, the alert module 114, and the feedback module 116. The mass storage device 512 also can be configured to store data such as the data stored by the IDS 102.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media that can be accessed by the computer architecture 500.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes of this specification and the claims, the phrase "computer-readable storage medium" and variations thereof, does not include waves, signals, and/or other transitory and/or intangible communication media.

According to various embodiments, the computer architecture 500 may operate in a networked environment using logical connections to remote computers through a network such as the network 104. The computer architecture 500 may connect to the network 104 through a network interface unit 516 connected to the bus 510. It should be appreciated that the network interface unit 516 also may be utilized to connect to other types of networks and remote computer systems, for example, the IDS 102 and the client device 120. The computer architecture 500 also may include an input/output controller 518 for receiving and processing input from a number of other devices, including a keyboard, mouse, or electronic stylus (not shown in FIG. 5). Similarly, the input/output controller 518 may provide output to a display screen, a printer, or other type of output device (also not shown in FIG. 5).

As mentioned briefly above, a number of program modules and data files may be stored in the mass storage device 512 and RAM 506 of the computer architecture 500, including an operating system 104 suitable for controlling the operation of the server, desktop, and/or laptop computer. The mass storage device 512 and RAM 506 also may store other types of program modules and data.

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Based on the foregoing, it should be appreciated that technologies for hyperlocal smoothing have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for hyperlocal smoothing, the computer-implemented method comprising performing computer-implemented operations for:
   receiving, at a computer executing a smoothing application, a request for explicit attribute data associated with an entity;
   determining, by the computer, that the explicit attribute data relating to the entity is not available;
   determining, by the computer, that the explicit attribute data relating to the entity or is unreliable by determining that the explicit attribute data is associated with an unreliable source;
   in response to determining that the explicit attribute data is either not available or unreliable
      analyzing, by the computer, attribute data comprising location data and related entities data,
      identifying, by the computer, a further entity that is related to the entity based upon the location data and the related entities data;
      obtaining, by the computer, related attribute data comprising attribute data relating to the further entity,
      calculating, by the computer, inferred attribute data for the entity based, at least partially, upon the related attribute data; and
   outputting, by the computer, the inferred attribute data.

2. The method of claim 1, wherein determining that the explicit attribute data is unreliable further comprises determining that the attribute data is sparse or outdated.

3. The method of claim 1, wherein calculating the inferred attribute data comprises extrapolating the related attribute data to obtain the inferred attribute data, and generating a confidence interval for the inferred attribute data.

4. The method of claim 1, further comprising receiving feedback relating to the inferred attribute data.

5. The method of claim 1, further comprising:
   receiving an alert request relating to the inferred attribute data;
   formatting at least one alert parameter relating to the alert request;
   receiving the related attribute data;
   calculating an updated value for the inferred attribute data;
   determining if the at least one alert parameter is satisfied;
   generating the alert, in response to determining that the at least one alert parameter is satisfied; and
   outputting the updated value for the inferred attribute data.

6. The method of claim 5, wherein the at least one alert parameter comprises an inferred attribute data value threshold.

7. The method of claim 1, wherein the attribute data further comprises review data describing reviews associated with entities, locations of the reviews, and times associated with the reviews, and wherein identifying the further entity comprises identifying the further entity based upon similarities between review data associated with the entity and review data associated with the further entity.

8. The method of claim 1, wherein the attribute data further comprises demographics data describing a first population at a first location associated with the entity, and a second population at a second location associated with the further entity, and wherein identifying the further entity comprises identifying the further entity based upon similarities between the first population and the second population.

9. The method of claim 1, wherein the attribute data further comprises contextual data that provides context for the location data, and wherein identifying the further entity comprises identifying the further entity based upon the location data and the contextual data.

10. The method of claim 1, wherein the attribute data further comprises temporal data defining operating hours of entities, and wherein identifying the further entity comprises identifying the further entity based upon similarities between temporal data associated with the entity and temporal data associated with the further entity.

11. A computer-implemented method for hyperlocal smoothing, the computer-implemented method comprising performing computer-implemented operations for:
   receiving, at a computer executing a smoothing application, a request for attribute data relating to an entity;
   determining, by the computer, if explicit attribute data relating to the entity is available and is reliable;
   in response to determining that the explicit attribute data is available and is reliable, outputting, by the computer, the explicit attribute data; and
   in response to determining that the explicit attribute data is not available or is unreliable, identifying, by the computer, at least one related entity located at a locale that is related to a location associated with the entity;

obtaining, by the computer, related attribute data comprising attribute data for the related entity;

calculating, by the computer, an inferred attribute data based, at least partially, upon the related attribute data; and outputting, by the computer, the inferred attribute data.

12. The method of claim 11, further comprising accessing related entities data to identify at least one related entity, and wherein receiving the related attribute data comprises obtaining attribute data corresponding to the at least one related entity.

13. The method of claim 12, wherein calculating the inferred attribute data comprises extrapolating from the related attribute data to obtain the inferred attribute data, and generating a confidence interval for the inferred attribute data.

14. The method of claim 13, further comprising:
receiving an alert request relating to the inferred attribute data;
formatting at least one alert parameter relating to the alert request;
receiving the related attribute data;
calculating an updated value for the inferred attribute data;
determining if the at least one alert parameter is satisfied, wherein the at least one alert parameter comprises an inferred attribute data value threshold that must be satisfied to generate an alert relating to the inferred attribute data; and
generating the alert, in response to determining that the inferred attribute data value threshold is satisfied.

15. The method of claim 14, wherein calculating the updated value for the inferred attribute data comprises extrapolating the related attribute data to obtain the inferred attribute data, and generating a confidence interval for the updated value for the inferred attribute data.

16. The method of claim 15, further comprising receiving feedback relating to the inferred attribute data.

17. The method of claim 11, wherein the attribute data comprises
location data describing locations associated with the entity and the related entity, and
related entities data describing a relationship between the entity and the related entity.

18. A computer-readable storage medium having computer readable instructions stored thereupon that, when executed by a computer, cause the computer to:
receive a request for attribute data relating to an entity;
determine if explicit attribute data relating to the entity is available and is reliable; and
in response to determining that the explicit attribute data is not available or is unreliable,
access related entities data associated with the entity to identify at least one related entity located at a locale that is related to a location associated with the entity,
obtain attribute data corresponding to the at least one related entity,
smooth the related attribute data to obtain the inferred attribute data,
generate a confidence interval corresponding to the value determined for the inferred attribute data,
output the inferred attribute data,
receive an alert request relating to the inferred attribute data,
format at least one alert parameter relating to the alert request,
receive the related attribute data,
calculate an updated value for the inferred attribute data,
determine if the at least one alert parameter is satisfied, wherein the at least one alert parameter comprises an inferred attribute data value threshold that must be satisfied to generate an alert relating to the inferred attribute data, and
generate the alert, in response to determining that the inferred attribute data value threshold is satisfied.

19. The computer-readable storage medium of claim 18, wherein the attribute data comprises
location data describing locations associated with the entity and the related entity,
demographics data describing a first population associated with the entity and a second population associated with the related entity, and
related entities data describing a relationship between the entity and the related entity.

* * * * *